(12) United States Patent
Moore et al.

(10) Patent No.: US 9,574,518 B2
(45) Date of Patent: Feb. 21, 2017

(54) TURBOFAN ENGINE WITH VARIABLE EXHAUST COOLING

(71) Applicant: The Boeing Company, Seal Beach, CA (US)

(72) Inventors: Matthew D. Moore, Everett, WA (US); Edward C. Marques, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 550 days.

(21) Appl. No.: 14/293,963

(22) Filed: Jun. 2, 2014

(65) Prior Publication Data

US 2015/0345395 A1    Dec. 3, 2015

(51) Int. Cl.
  *F02K 1/38* (2006.01)
  *B64D 33/04* (2006.01)
  *F02K 1/48* (2006.01)
  *F02K 3/077* (2006.01)
  *F02K 1/34* (2006.01)

(52) U.S. Cl.
  CPC .............. *F02K 1/383* (2013.01); *B64D 33/06* (2013.01); *F02K 1/386* (2013.01); *F02K 1/48* (2013.01); *F02K 3/077* (2013.01); *F05D 2250/41* (2013.01); *F05D 2250/411* (2013.01); *F05D 2250/90* (2013.01)

(58) Field of Classification Search
  CPC . F02K 1/383; F02K 1/386; F02K 1/42; F02K 1/09; F02K 1/46; F02K 1/50; F02K 1/48; F02K 3/077; F02K 3/075; B64D 33/06
  See application file for complete search history.

(56) References Cited

U.S. PATENT DOCUMENTS 3,481,427 A    12/1969  Dobbs et al.
3,579,993 A    5/1971   Tanner
(Continued)

OTHER PUBLICATIONS

Stage III Technologies, "Ejector," www.stageiii.com/hushkit_ejector.asp, Mar. 15, 2007.
(Continued)

*Primary Examiner* — Andrew Nguyen
(74) *Attorney, Agent, or Firm* — DASCENZO Intellectual Property Law, P.C.

(57) ABSTRACT

Disclosed aircraft and turbofan engines have an active configuration (corresponding to flight, etc.) and an idle configuration (corresponding to ground idle). Turbofan engines comprise a core engine, a nacelle, a bypass duct therebetween, and a bypass splitter shell that extends at least partially between the nacelle and the core engine to define peripheral and interstitial bypass ducts. Bypass flow in the bypass duct splits into peripheral bypass flow and interstitial bypass flow. The relatively cool, slow interstitial bypass flow is directed into relatively hot, fast core exhaust flow from the core engine and into a mixed exhaust duct at least partially defined by the bypass splitter shell. The bypass splitter shell may be selectively positioned to increase (in the idle configuration) or to decrease (in the active configuration) the relative flow of the interstitial bypass flow, thereby cooling and/or slowing the mixed exhaust flow in the idle configuration.

19 Claims, 6 Drawing Sheets

(56) References Cited

U.S. PATENT DOCUMENTS

| | | | |
|---|---|---|---|
| 3,598,318 A | * | 8/1971 | Schiel ................. F02K 1/06 239/265.13 |
| 3,601,340 A | | 8/1971 | Hilbig |
| 3,721,389 A | | 3/1973 | MacKinnon et al. |
| 3,726,091 A | | 4/1973 | Tontini |
| 3,814,323 A | | 6/1974 | Leynaert et al. |
| 3,910,375 A | | 10/1975 | Hache et al. |
| 4,117,671 A | | 10/1978 | Neal et al. |
| 4,142,365 A | | 3/1979 | Sargisson et al. |
| 4,214,441 A | | 7/1980 | Mouritsen et al. |
| 4,235,303 A | | 11/1980 | Dhoore et al. |
| 4,285,194 A | * | 8/1981 | Nash ................. F02K 1/822 60/262 |
| 4,372,110 A | | 2/1983 | Cheng |
| 4,373,328 A | | 2/1983 | Jones |
| 4,501,393 A | | 2/1985 | Klees et al. |
| 5,041,323 A | | 8/1991 | Rose et al. |
| 5,216,879 A | | 6/1993 | Zysmaan |
| 5,261,227 A | | 11/1993 | Giffin, III |
| 5,440,875 A | | 8/1995 | Torkelson et al. |
| 5,603,471 A | | 2/1997 | Armstrong |
| 5,758,488 A | | 6/1998 | Batey |
| 5,761,900 A | | 6/1998 | Presz, Jr. |
| 5,775,095 A | | 7/1998 | Zysman et al. |
| 5,884,843 A | | 3/1999 | Lidstone et al. |
| 6,070,407 A | | 6/2000 | Newton |
| 6,210,773 B1 | | 4/2001 | Moore |
| 6,311,928 B1 | | 11/2001 | Presz, Jr. et al. |
| 6,786,038 B2 | | 9/2004 | Lair |
| 6,854,260 B2 | | 2/2005 | Anderson |
| 6,935,098 B2 | | 8/2005 | Bardagi et al. |
| 7,434,384 B2 | | 10/2008 | Lord et al. |
| 7,762,057 B2 | | 7/2010 | Sloan et al. |
| 7,882,696 B2 | | 2/2011 | Anderson et al. |
| 7,921,966 B2 | | 4/2011 | Chiou et al. |
| 8,341,935 B2 | | 1/2013 | Marques et al. |
| 2003/0182925 A1 | * | 10/2003 | Lair ................. B64D 33/06 60/226.1 |
| 2004/0244357 A1 | | 12/2004 | Sloan |
| 2005/0082112 A1 | | 4/2005 | Harrison |
| 2006/0112675 A1 | | 6/2006 | Anderson et al. |
| 2006/0207239 A1 | | 9/2006 | Anderson et al. |
| 2008/0271431 A1 | | 11/2008 | Porte |
| 2011/0167785 A1 | | 7/2011 | Moore et al. |
| 2012/0128467 A1 | * | 5/2012 | Ruthemeyer ........... F01D 5/146 415/115 |
| 2013/0092756 A1 | * | 4/2013 | Kennea ................. F02K 1/09 239/265.33 |

OTHER PUBLICATIONS

Nakamura, "Japanese Activities on Engine Noise Technology, Focusing on SST and Small Subsonic Aircraft," UK-Japan Bilateral Workshop on the Environmental Impact of Aircraft Emissions & Noise and Impact Reduction Technologies, Tokyo, Japan, Jan. 17-19, 2006.

* cited by examiner

TURBOFAN ENGINE WITH VARIABLE EXHAUST COOLING

FIELD

The present disclosure relates to turbofan engines.

BACKGROUND

Turbofan engines, commonly used to power aircraft, are a type of air-breathing jet engine that includes a fan and a core (turbine) engine that both provide propulsive flow (i.e., a portion of the thrust of the turbofan engine is generated by the fan and a portion is generated by the core engine). Generally, the propulsive flows from the fan and core engine are separately ducted through the turbofan engine and not mixed within the turbofan engine. The core engine of the turbofan engine burns fuels and therefore yields hot exhaust at high velocity even when operated at idle speeds, such as at ground idle speed.

Some operations of aircraft require that engines remain running while on the ground during onloading and/or offloading (such as in Engines Running Operations (ERO) procedures). During such operations, personnel should stay clear of hot, fast exhaust flow (sometimes called jet wash or jet blast) from aircraft engines such as turbofan engines. Conventional engines, during ground idle, may emit jet blast at a temperature of greater than 250° C. and at a speed of greater than 150 km/h.

For some ERO procedures, aircraft may employ heavy, complex core exhaust diverter mechanisms that divert hot core engine exhaust away (typically upwards) from ground personnel. A core exhaust diverter is different than a fan thrust reverser that most transport aircraft use to direct fan flow forward, e.g., to decelerate the aircraft on landing. For example, a C-17 transport aircraft may employ its core exhaust diverter and its fan thrust reversers during ERO to divert core engine exhaust and fan flow away from ground personnel and to make the environment behind the engines tolerable during ERO. Such core exhaust diverter mechanisms require extra fuel (due to weight) and extra maintenance (due to mechanical complexity).

Hence, there is a need for better mechanisms and/or methods to avoid high velocity, hot exhaust plumes emanating from the back of turbofan-powered aircraft during ground operations.

SUMMARY

The present disclosure describes aircraft and turbofan engines with at least two configurations: an active configuration and an idle configuration. In the active configuration, turbofan engines are configured for flight, takeoff, and/or landing. In the idle configuration, turbofan engines are configured for ground idle and emit a relatively cool and/or slow exhaust flow. Turbofan engines may include a ground idle state where the engine is operating at ground idle speed and the turbofan engine is in the idle configuration.

Turbofan engines comprise a core engine radially surrounded by a nacelle to define a bypass duct between the nacelle and the core engine. Turbofan engines further comprise a bypass splitter shell, substantially coaxial with the core engine and the nacelle, that extends at least partially between the nacelle and the core engine to define a peripheral bypass duct and an interstitial bypass duct. Bypass flow in the bypass duct splits into peripheral bypass flow in the peripheral bypass duct and interstitial bypass flow in the interstitial bypass duct. The interstitial bypass duct is configured to direct the interstitial bypass flow into core exhaust flow from the core engine and into a mixed exhaust duct at least partially defined by an aft portion of the bypass splitter shell.

The bypass splitter shell may be selectively positioned to increase the relative flow of the interstitial bypass flow (in the idle configuration of the turbofan engine) or to decrease the relative flow of the interstitial bypass flow (in the active configuration of the turbofan engine). The interstitial bypass flow is substantially cooler and slower than the core exhaust flow and, hence, an increase in the amount of interstitial bypass flow into the mixed exhaust duct results in a cooler and/or slower mixed exhaust flow. Turbofan engines may include an actuator to selectively and/or axially translate the bypass splitter shell between the active configuration and the idle configuration.

DESCRIPTION

Figure 1:
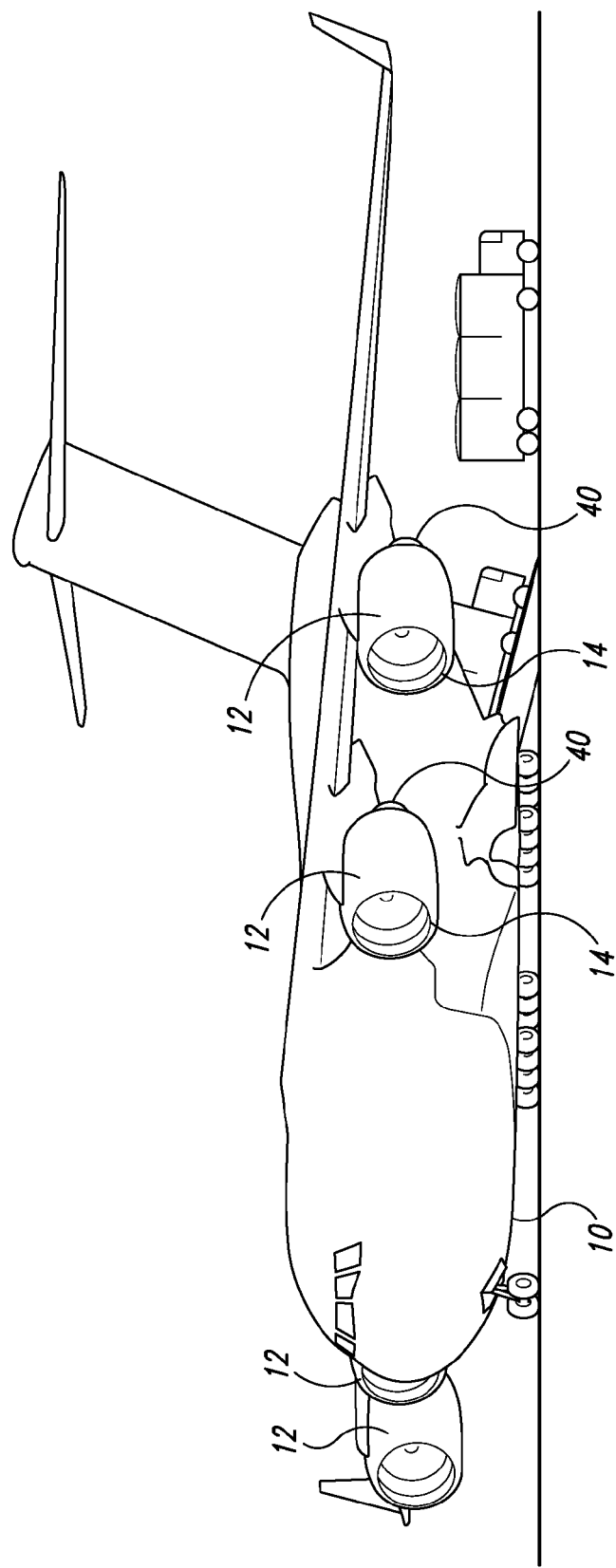
FIG. 1. is a drawing of an illustrative, non-exclusive example of an aircraft including turbofan engines of the present disclosure.

FIGS. 1-6 illustrate aircraft, turbofan engines, and associated components. Elements that serve a similar, or at least substantially similar, purpose are labeled with numbers consistent among the figures. Like numbers in each of the figures, and the corresponding elements, may not be discussed in detail herein with reference to each of the figures. Similarly, all elements may not be labeled in each of the figures, but reference numerals associated therewith may be used for consistency. Elements, components, and/or features that are discussed with reference to one or more of the figures may be included in and/or used with any of the figures without departing from the scope of the present disclosure. In general, elements that are likely to be included are illustrated in solid lines, while elements that may be optional or alternatives are illustrated in dashed lines and/or with dashed lead lines. However, elements that are shown in solid lines are not necessarily essential, and an element shown in solid lines may be omitted without departing from the scope of the present disclosure.

FIG. 1 illustrates an example of an aircraft 10 that incorporates a turbofan engine 12 of the present disclosure. Aircraft 10 may be commercial, civilian, and/or military aircraft, and may be adapted for transport of people and/or cargo. For example, aircraft 10 may be jets, planes, fixed-wing aircraft, larger aircraft (e.g., heavy-lift transports, long-haul transports), and/or smaller aircraft (e.g., regional transports). Illustrative, non-exclusive examples of suitable aircraft 10 include variants of Boeing C-17 aircraft, variants of Boeing 747 aircraft and/or variants of Bombardier CRJ200 aircraft.

Aircraft 10 may incorporate one or more turbofan engines 12. Though the example aircraft 10 in FIG. 1 includes four turbofan engines 12, aircraft 10 may include any suitable number of turbofan engines 12 and may include some engines that are turbofan engines 12 and some engines that are not. Turbofan engines 12 are generally coupled to aircraft 10 along the wings (as seen in FIG. 1), tail, and/or fuselage.

Figure 2:
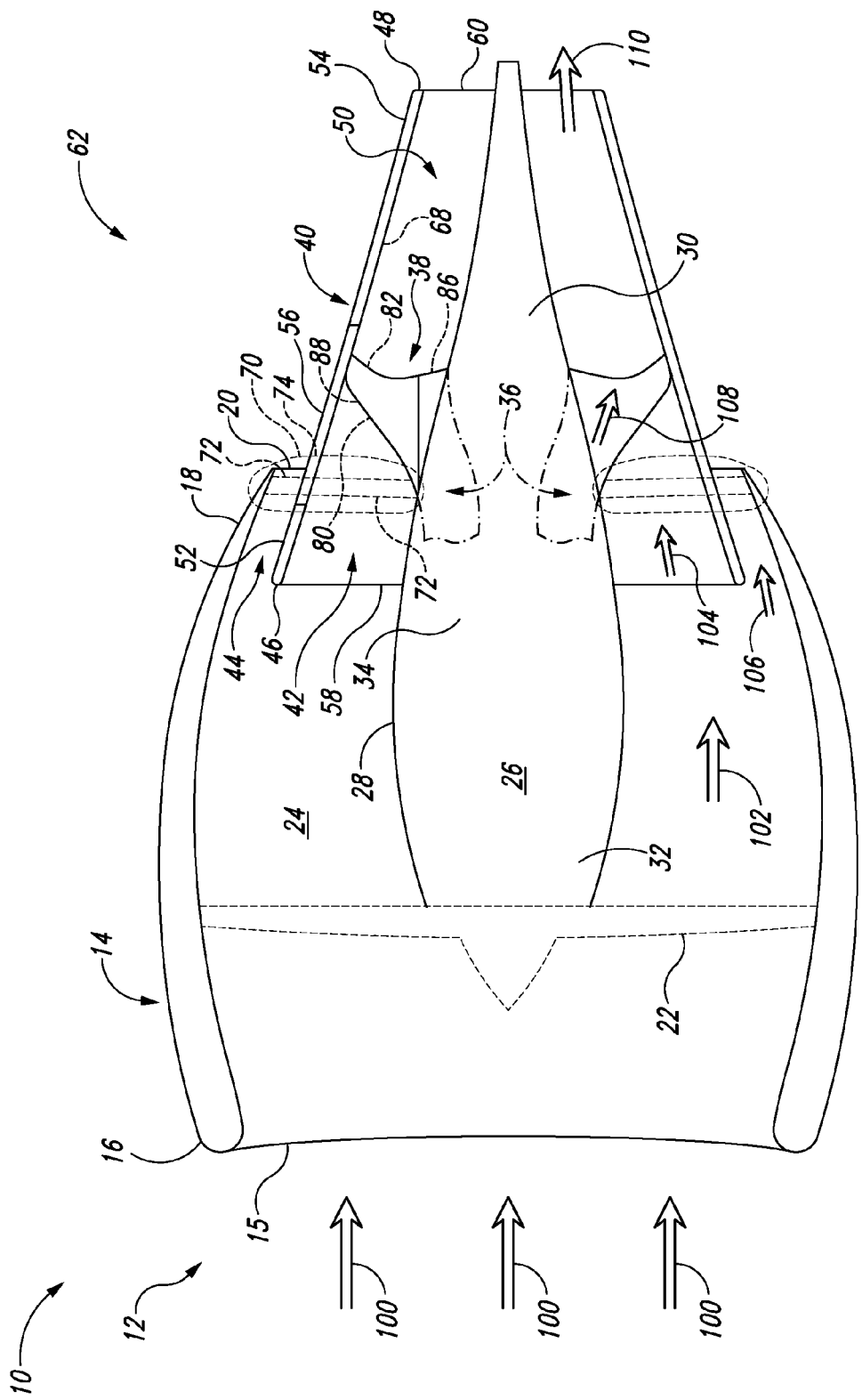
FIG. 2 is a schematic cross-sectional view of a turbofan engine.

As better viewed in the schematic cross-sectional view of FIG. 2, turbofan engines 12 comprise a fan 22, a core engine 26, and a nacelle 14 that radially surrounds at least a fore portion 32 of the core engine 26. Typically, the fan 22 is forward of the core engine 26 and the nacelle 14 also surrounds the fan 22.

Nacelles 14 are generally housings that form at least a portion of the exterior of turbofan engines 12 and are generally aerodynamically contoured. Nacelles 14 are generally "short" nacelles, ending in an aft portion 18 forward of the aftmost part of the turbofan engine 12 (e.g., the core engine 26 may extend aftward of the nacelle 14). Nacelles 14 have a fore portion 16 that generally is configured to define an inlet 15 (also called an engine inlet or a fan inlet) that guides ambient air 100 into the turbofan engine 12, e.g., to the fan 22 and/or the core engine 26. In operation, the fan 22 produces at least a bypass flow 102 of fan-pressurized air. As used herein, a flow of gas, such as the bypass flow 102, may also be referred to as a stream and/or a plume (in particular if relating to a hot flow). The bypass flow 102 flows through a bypass duct 24 that is partially defined by the nacelle 14. Nacelles 14 also include an aft portion 18 that terminates in a nozzle exit 20 (also called a fan nozzle exit) that exhausts at least a portion of the bypass flow 102 as described further herein.

Core engines 26 are turbine engines that axially compress air and combust fuel to produce a jet of hot exhaust gases. The jet of exhaust gases is referred to herein as core exhaust flow 108. In conventional turbofan engines, the core engine emits a jet of hot exhaust gases extending like a flame behind the turbofan engine, e.g., when viewed by a thermal camera.

Core engines 26 include a core engine shroud 28 (also referred to as a core engine casing or a core engine case) that covers and/or supports the inner workings of the core engine 26. Core engines 26 and/or core engine shrouds 28 are generally positioned coaxially within the nacelle 14. Specifically, at least a portion of the core engine 26 is positioned within the nacelle 14, with the fore portion 32 of the core engine 26 forward of the nozzle exit 20 of the nacelle 14. The bypass duct 24 is defined between the nacelle 14 and the core engine 26 and, hence, the core engine 26 and/or the core engine shroud 28 defines a portion of the bypass duct 24. Core engines 26 also include a core exhaust duct 36 (also called a turbine exhaust duct) that transmits the core exhaust flow 108 from the core engine 26 and out of one or more nozzle exits 38. The exterior of the core exhaust duct 36 may be contiguous with and/or form a portion of the core engine shroud 28. The core exhaust duct 36 generally is located in, and/or extends into, an aft portion 34 of the core engine 26.

Turbofan engines 12 also may comprise a center body 30. The nozzle exit(s) 38 of the core exhaust duct(s) 36 generally direct core exhaust flow 108 onto and/or around the center body 30. The center body 30 may have an aerodynamic shape to direct exhaust and/or air flow, and may include internal airflow channel(s) such as a centerline vent. The center body 30 generally includes the aftmost portion of the core engine 26 and/or the turbofan engine 12. The core exhaust duct 36, the nozzle exit(s) 38, the center body 30, and/or the aft portion 34 of the core engine 26 may extend beyond the aft portion 18 of the nacelle 14 (e.g., a short nacelle).

Turbofan engines 12 also comprise a bypass splitter shell 40 (also called a bypass splitter shroud) that is positioned at least partially within the nacelle 14, specifically within the aft portion 18 of the nacelle 14. If the turbofan engine 12 includes a fan thrust reverser, the bypass splitter shell 40 generally is aftward of the fan thrust reverser and/or configured to avoid interference with the fan thrust reverser. The bypass splitter shell 40 is positioned and configured to split the bypass flow 102 into an interstitial bypass flow 104 and a peripheral bypass flow 106. The bypass splitter shell 40 is substantially coaxial with the nacelle 14, the core engine 26, and/or the core engine shroud 28, and between the nacelle 14 and the core engine 26.

The bypass splitter shell 40 includes a leading edge 46 along a fore portion 52 of the bypass splitter shell 40. The leading edge 46 and the bypass splitter shell 40 extend into nacelle 14 to the bypass duct 24 to define an interstitial bypass duct 42 and a peripheral bypass duct 44 configured to transmit the interstitial bypass flow 104 and the peripheral bypass flow 106, respectively. The interstitial bypass duct 42 is defined between the bypass splitter shell 40 and the core engine 26 (generally, the core engine shroud 28 and/or the core exhaust duct 36). The peripheral bypass duct 44 is defined between the nacelle 14 and the bypass splitter shell 40. The peripheral bypass duct 44 is configured to transmit the peripheral bypass flow 106 relatively unhindered through the peripheral bypass duct 44, to exit from the aft portion 18 of the nacelle 14 (at the nozzle exit 20). The peripheral bypass flow 106 may provide a portion of the engine thrust as does conventional bypass flow of a conventional turbofan engine.

The bypass splitter shell 40 also includes a trailing edge 48 along an aft portion 54 of the bypass splitter shell 40. Generally, at least the aft portion 54 of the bypass splitter shell 40 extends axially aftward of the aft portion 18 of the nacelle 14. The aft portion 54 (or at least a portion thereof) extends axially aftward of the core exhaust duct 36 and the nozzle exit(s) 38. The interstitial bypass duct 42 opens into a mixed exhaust duct 50 defined at least in part by the bypass splitter shell 40 (generally, at least in part by the aft portion 54 of the bypass splitter shell 40 and the center body 30). The interstitial bypass duct 42 is configured to transmit the interstitial bypass flow 104 through the interstitial bypass duct 42 toward the mixed exhaust duct 50. The transition from the interstitial bypass duct 42 to the mixed exhaust duct 50 is where the core exhaust flow 108 exits the core exhaust duct 36.

The mixed exhaust duct 50 is configured to mix the interstitial bypass flow 104 and the core exhaust flow 108. Hence, the mixed exhaust duct 50 may be called a mixer and the bypass splitter shell 40, which at least partially defines the mixer, may be called a (partial) bypass mixer shell (or shroud). The mixed exhaust duct 50 terminates at the trailing edge 48 of the bypass splitter shell 40 with a nozzle exit 60. Generally, the mixed exhaust duct 50 is convergent toward the nozzle exit 60, i.e. the entrance side of the mixed exhaust duct 50 has a larger circumference than the circumference of the nozzle exit 60. More generally, the bypass splitter shell 40 may be substantially, and/or generally, frustoconical with an opening at the leading edge 46 and an opening at the trailing edge 48. Whether frustoconical or otherwise, the circumference of the opening at the leading edge 46 generally is larger than the circumference of the opening at the trailing edge 48 (nozzle exit 60).

The mixed exhaust duct 50 is positioned and/or configured to receive the interstitial bypass flow 104 and the core exhaust flow 108. The mixed exhaust duct 50 is further configured to at least partially mix the interstitial bypass flow 104 and the core exhaust flow 108 to form a mixed exhaust flow 110 that exits the mixed exhaust duct through the nozzle exit 60. The mixed exhaust flow 110 may provide a portion of the engine thrust as does conventional core exhaust flow of a conventional turbofan engine.

Generally, the total flow of the bypass flow 102 is split into the two flows: the interstitial bypass flow 104 and the peripheral bypass flow 106. However, some portion of the bypass flow 102 may be directed and/or escape into another flow besides the interstitial bypass flow 104 and the peripheral bypass flow 106. Where the bypass flow 102 is split only into the interstitial bypass flow 104 and the peripheral bypass flow 106, the total flow of the bypass flow 102 is the same as the sum of the flows of the interstitial bypass flow 104 and the peripheral bypass flow 106. Similarly, the mixed exhaust flow 110 generally is sourced from the entire interstitial bypass flow 104 and the entire core exhaust flow 108. However, the mixed exhaust flow 110 may include flow from another source and/or some of the interstitial bypass flow 104 and/or the core exhaust flow 108 may be directed and/or escape into another flow besides the mixed exhaust flow 110. For example, the mixed exhaust flow 110 may include flow from core engine cooling and/or ventilation. Because flows may differ in temperature, pressure, and/or velocity, flow rates, total flows, and other flow quantities are expressed with respect to the mass of the gas in the flow unless clearly stated otherwise.

Generally, the ratio of the peripheral bypass flow 106, one contribution to the engine thrust, to the mixed exhaust flow 110, another contribution to the engine thrust, is configured like a conventional turbofan engine. In a low-bypass turbofan engine, the mass flow ratio of the bypass flow to the core exhaust flow typically is about 0.5-3 (i.e., the mass flow of the bypass flow is about 0.5-3 times larger than the mass flow of the core exhaust flow). In a high-bypass turbofan engine, the same mass flow ratio typically is about 4-10 or greater. Hence, turbofan engine 12 may be configured to operate with a mass flow ratio of the peripheral bypass flow 106 to the mixed exhaust flow 110 of about 0.5, about 1, about 1.5, about 2, about 2.5, about 3, about 3.5, about 4, about 4.5, about 5, about 6, about 8, about 10, greater than 1, greater than 2, greater than 3, greater than 5, greater than 6, greater than 8, greater than 10, 0.5-3, and/or 4-10. The mass flow of the peripheral bypass flow 106 may be about 90%, about 85%, about 80%, about 75%, about 70%, about 60%, about 50%, about 40%, about 30%, about 20%, a majority, or a minority of the bypass flow 102. The mass flow of the interstitial bypass flow 104 may be about 10%, about 15%, about 20%, about 25%, about 30%, about 40%, about 50%, about 60%, about 70%, about 80%, a minority, or a majority of the bypass flow 102. The mass flow ratio of the interstitial bypass flow 104 to the core engine exhaust 108 may be about 0.5, about 1, about 1.5, about 2, about 2.5, about 3, or about 4.

Mixing the core exhaust flow 108 with the interstitial bypass flow 104 in the mixed exhaust duct 50 results in a mixed exhaust flow 110 that is cooler and/or slower than the core exhaust flow 108. The core exhaust flow 108 is hot, as it results from the combustion of fuel within the core engine 26, and may have an average temperature far above 100° C. (e.g., 400° C.), depending on operating conditions. Additionally, the core exhaust flow 108 is a high-speed jet of exhaust, having an average speed that may be far above 100 km/h (e.g., 2,000 km/h), depending on operating conditions. The bypass flow 102 is relatively cold (typically between ambient temperature and 40° C.), as it results from ambient air flow through the fan 22. Additionally, the bypass flow 102 is relatively slow (typically less than 150 km/h at ground idle speed).

Turbofan engines 12 are configured to adjustably mix the core exhaust flow 108 with the interstitial bypass flow 104. The mix ratio may be adjusted between two or more values. At higher ratios of the interstitial bypass flow 104 to the core exhaust flow 108, the resulting mixed exhaust flow 110 is cooler than at lower ratios.

Figure 3:
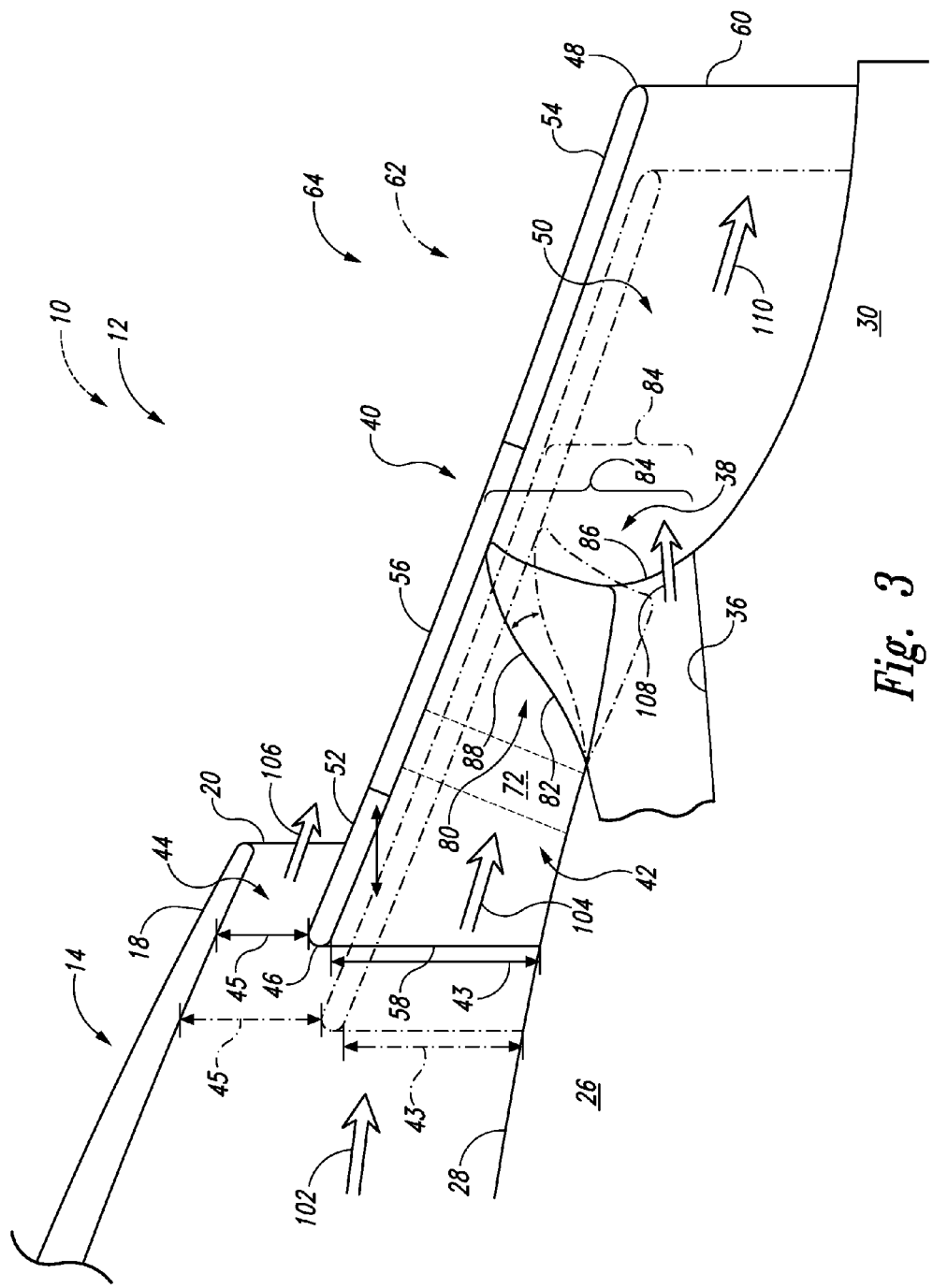
FIG. 3 is a schematic representation of a portion of a turbofan engine in two different configurations.

As viewed in FIG. 3, turbofan engines 12 are configured to transition between at least an active configuration 62 (dot-dash lines) and an idle configuration 64 (solid lines). In the active configuration, turbofan engines 12 are configured for flight, takeoff, and/or landing, and are configured for a lower interstitial bypass flow 104 to core exhaust flow 108 ratio (and thus are configured to emit a relatively hotter, faster mixed exhaust flow 110). In the idle configuration, turbofan engines 12 are configured for ground idle and are configured for a higher interstitial bypass flow 104 to core exhaust flow 108 ratio (and thus are configured to emit a relatively cooler, slower mixed exhaust flow 110). Turbofan engines 12 may include a ground idle state where the engine is operating at ground idle speed and the turbofan engine 12 is in the idle configuration 64.

In the active configuration 62 of the turbofan engine 12 (which also may be referred to as the active configuration of the bypass splitter shell 40), the bypass splitter shell 40 is positioned to split some of the bypass flow 102 into the peripheral bypass flow 106 and the interstitial bypass flow 104, and is positioned to mix the interstitial bypass flow 104 with the core exhaust flow 108 to form the mixed exhaust flow 110. In the idle configuration 64 of the turbofan engine 12 (which also may be referred to as the idle configuration of the bypass splitter shell 40), the bypass splitter shell 40 is positioned aftward of its position in the active configuration 62 and is positioned to increase the amount of the interstitial bypass flow 104 relative to the amount in the active configuration 62. Generally, the difference in position of the bypass splitter shell 40 is an axial displacement of the bypass splitter shell 40 as a whole. For example, the leading edge 46 of the bypass splitter shell 40 in the active configuration 62 is forward of the leading edge 46 in the idle configuration 64. The nacelle 14, the core engine shroud 28, and the bypass splitter shell 40 are configured such that the axial displacement results in a change of the ratios of the interstitial bypass flow 104 to the peripheral bypass flow 106 and to the core exhaust flow 108. For example and as schematically represented in FIG. 3, the nacelle 14, the core engine shroud 28, and/or the bypass splitter shell 40, where they define the interstitial bypass duct 42 and/or the peripheral bypass duct 44, may be tapered, axially inclined, and/or convergent toward the nozzle exit 60.

In both the active configuration 62 and the idle configuration 64, the bypass splitter shell 40 extends into the aft portion 18 of the nacelle 14 and is configured to split the bypass flow into an interstitial bypass flow 104 and a peripheral bypass flow 104. The aftward displacement of the bypass splitter shell 40 in the idle configuration 64 increases the open area 43 (also called the inlet area) of the interstitial bypass duct 42 at the leading edge 46 of the bypass splitter shell 40 (i.e., at the interstitial bypass inlet 58). Additionally, the aftward displacement of the bypass splitter shell 40 increases the ratio of the open area 43 of the interstitial bypass duct 42 to the open area 45 of the peripheral bypass duct 44 at the leading edge 46, i.e., a higher portion of the total of the interstitial bypass flow 104 and the peripheral bypass flow 106 is directed into the interstitial bypass flow 104. Generally, the open area 45 of the peripheral bypass duct 44 decreases as the open area 43 of the interstitial bypass duct 42 increases. As an example of flow through the open area 43 in the two configurations, the open area 43 of the interstitial bypass duct 42 may be configured to receive 40% of the bypass flow 102 in the active configuration 62 and configured to receive 60% of the bypass flow 102 in the idle configuration 64. The ratio of the open area 43 of the interstitial bypass duct 42 to the open area 45 of the peripheral bypass duct 44, and/or the ratio of the interstitial bypass flow 104 to the peripheral bypass flow 106, may be about 0.7 (e.g., a 40%-60% split) in the active configuration 62 while the same ratio may be about 1.5 (e.g., a 60%-40% split) in the idle configuration 64.

In the active configuration 62, the bypass splitter shell 40 generally is positioned to define an interstitial bypass duct 42 that receives sufficient interstitial bypass flow 104 to mix with the core exhaust flow 108 at a ratio of about 2 (i.e., about 2 parts interstitial bypass flow to 1 part core exhaust flow 108). Suitable mass ratios of the interstitial bypass flow 104 to the core exhaust flow 108 within the mixed exhaust flow 110 include about 1, about 1.5, about 2, about 2.5, or about 3; greater than 1, greater than 1.5, or greater than 2; and/or less than 4, less than 3, or less than 2. The interstitial bypass flow 104 may be about 10%, about 15%, about 20%, about 25%, about 30%, about 40%, about 50%, or a minority of the bypass flow 102. Additionally or alternatively, the interstitial bypass flow 104 may be less than the peripheral bypass flow 106.

In the idle configuration 64, the bypass splitter shell 40 generally is positioned to define an interstitial bypass duct 42 that receives sufficient interstitial bypass flow 104 to mix with the core exhaust flow 108 at a ratio of about 3 (i.e., about 3 parts interstitial bypass flow to 1 part core exhaust flow 108). Suitable mass ratios of the interstitial bypass flow 104 to the core exhaust flow 108 within the mixed exhaust flow 110 include about 1.5, about 2, about 2.5, about 3, or about 4; greater than 1.5, greater than 2, or greater than 3; and/or less than 5, less than 4, or less than 3. The interstitial bypass flow 104 may be about 20%, about 25%, about 30%, about 40%, about 50%, about 60%, about 70%, about 80%, or a majority of the bypass flow 102. Additionally or alternatively, the interstitial bypass flow 104 may be greater than the peripheral bypass flow 106. The idle configuration 64 may be configured to produce, when the turbofan engine 12 is operating at ground idle speed, the mixed exhaust flow 110 with an average temperature (at the nozzle exit 60) of less than 200° C., less than 150° C., less than 120° C., less than 100° C., less than 80° C., less than 60° C., or less than 50° C. and/or with an average speed (at the nozzle exit 60) of less than 150 km/h, less than 100 km/h, less than 80 km/h, or less than 60 km/h.

Returning to FIG. 2, the turbofan engine 12 may comprise an actuator 70 coupled to the bypass splitter shell 40 and configured to translate the bypass splitter shell 40 between the active configuration 62 and the idle configuration 64. The actuator 70 generally is configured for selective translation and/or axial translation of the bypass splitter shell 40. With the actuator 70, an aircraft operator may move the bypass splitter shell 40 into the idle configuration 64 for ground idle operations (e.g., onload and/or offload) and/or may move the bypass splitter shell 40 into the active configuration 62 for flight, takeoff, and/or landing. Actuators 70 may be any suitable type and may be located at least partially remote from the bypass splitter shell 40, the core engine 26, and/or the nacelle 14. For example, the actuator 70 may be, or may include, a hydraulic actuator and/or an electro-mechanical actuator. Actuators 70 and/or turbofan engines 12 may include an interlock device to avoid transitioning from the active configuration 62 to the idle configuration 64 during flight, takeoff and/or landing. The actuator 70 may be isolated from flows, for example by being enclosed in side walls or the interior of the engine to aircraft mounting pylon, for wing mounted or fuselage mounted engines.

Bypass splitter shells 40 may be supported by one or more pillars 72 (also called struts) between the bypass splitter shell 40 and at least one of the core engine shroud 28, the core exhaust duct 36, and the nacelle 14. When plural pillars 72 are present, they may be radially spaced apart along the circumference of the bypass splitter shell 40. Pillar(s) 72 may be coupled to the actuator 70 and a mechanism 74 may be provided that is configured to permit selective axial translation of the bypass splitter shell 40 between the idle configuration 64 and the active configuration 62. Mechanisms 74 may include and/or may be a rail, a linear rail, a curved rail, a slide, a linear slide, a curved slide, a guide, a linear guide, and/or a curved guide. The bypass splitter shell 40, the pillar 72, the core engine shroud 28, the core exhaust duct 36, and/or the nacelle 14 may include the mechanism 74.

Bypass splitter shells 40 may include a central portion 56 between the fore portion 52 and the aft portion 54. The central portion 56 may be configured to support the fore portion 52 and the aft portion 54. The central portion 56 may be configured as the only structure supporting the fore portion 52 and the aft portion 54. The central portion 56 may be configured to support the bypass splitter shell 40, e.g., one or more pillars 72 may be coupled to the central portion 56. The three portions (i.e., the fore portion 52, the aft portion 54, and the central portion 56) may be formed of different materials and may be designed differently. For example, where the central portion 56 supports the bypass splitter shell 40, the central portion 56 may be configured to withstand the support forces. As other examples, the central portion 56 and/or the aft portion 54 may be configured to withstand significant heat from the core engine 26, the core engine shroud 28, the core exhaust duct 36, and/or the core exhaust flow 108. The three portions of the bypass splitter shell 40 may be separate components (e.g., annular shells) assembled into a unified bypass splitter shell 40 or may be separate regions of the bypass splitter shell 40. The three portions and bypass splitter shell 40 each independently may be formed of metal, metal alloy, ceramic, ceramic matrix composite, and/or porous composite. Each may be formed of a monolithic piece, an assemblage of pieces, a sandwich panel, and/or a honeycomb panel.

Further, bypass splitter shells 40 may be configured to attenuate noise that may emanate from the turbofan engine 12, for example, by including (or by being at least partially formed of) an acoustic attenuator 68. Acoustic attenuators 68 are configured to dampen, dissipate, and/or absorb acoustic energy. The fore portion 52, the aft portion 54, and the central portion 56 each independently may include, or be at least partially formed of, an acoustic attenuator 68. For example, the central portion 56 may not include, or may be free of, any acoustic attenuator 68. Acoustic attenuators 68 may be, or may include, a porous material, a honeycomb sandwich structure, a bulk absorbing material, and/or a foam.

As schematically illustrated in FIGS. 2-3, turbofan engines 12 may include a lobed mixer 80 (also called a lobe-type mixer) radially surrounded by the bypass splitter shell 40. The lobed mixer 80 includes one or more lobes 88 that protrude from the core engine shroud 28 and/or the core engine 26 into the interstitial bypass duct 42. The lobed mixer 80 may be configured to efficiently mix the core exhaust flow 108, or at least a portion thereof, with the interstitial bypass flow 104, generally in conjunction with, and within, the mixed exhaust duct 50. The lobed mixer 80, a particular embodiment of the core exhaust duct(s) 36 and the nozzle exit(s) 38, is configured to emit at least a portion of the core exhaust flow 108 into the mixed exhaust duct 50 to mix with the interstitial bypass flow 104. In some embodiments, essentially all of the core exhaust flow 108 is mixed with the interstitial bypass flow 104 in the mixed exhaust duct 50. As the interstitial bypass flow 104 varies (e.g., due to the change in configuration between the idle configuration 64 and the active configuration 62), the ratio of the amount of the interstitial bypass flow 104 to the core exhaust flow 108 mixed in the mixed exhaust duct 50 may change.

Figure 4:
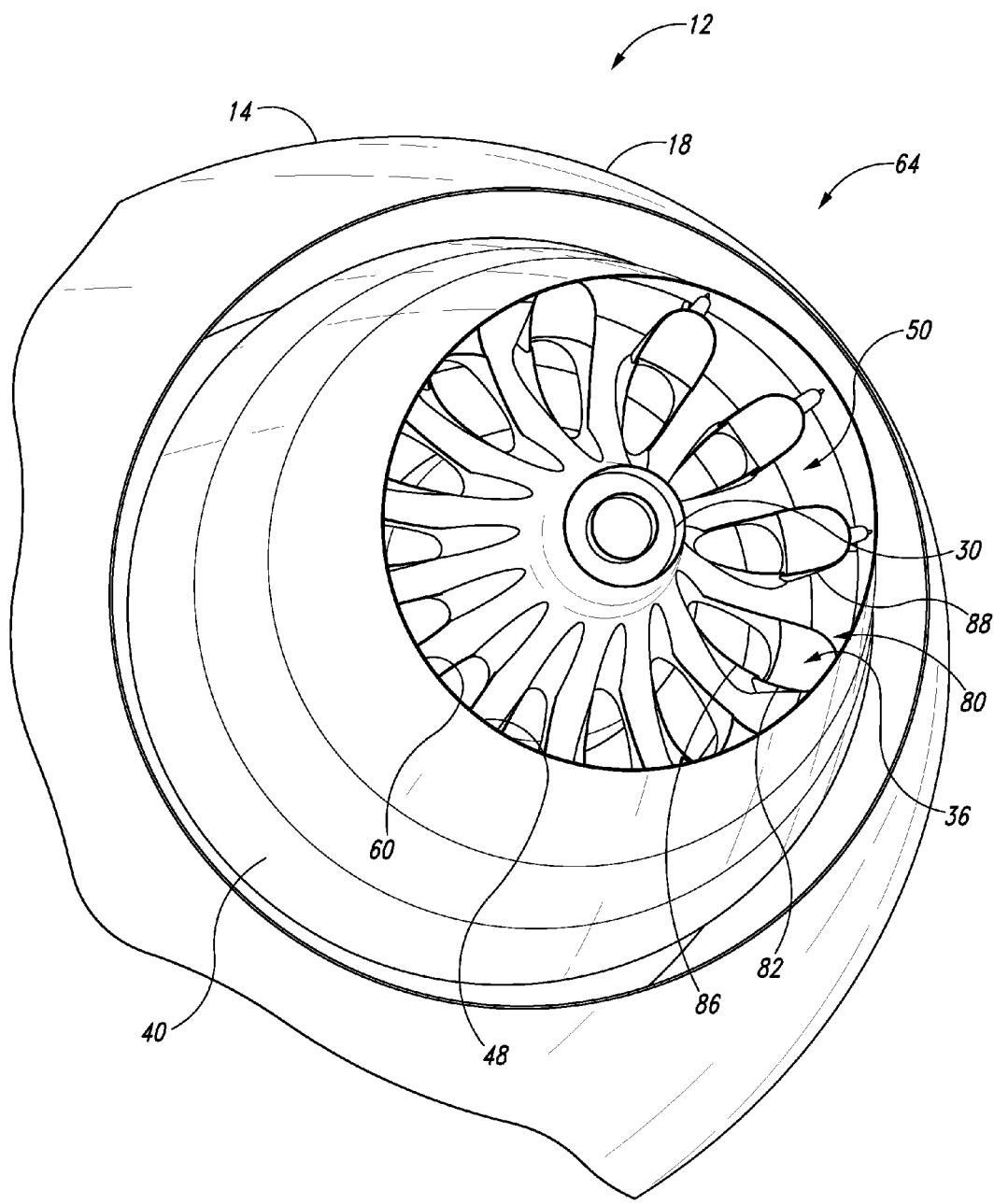
FIG. 4 is an aft view of an illustrative, non-exclusive example of a turbofan engine.
Figure 5:
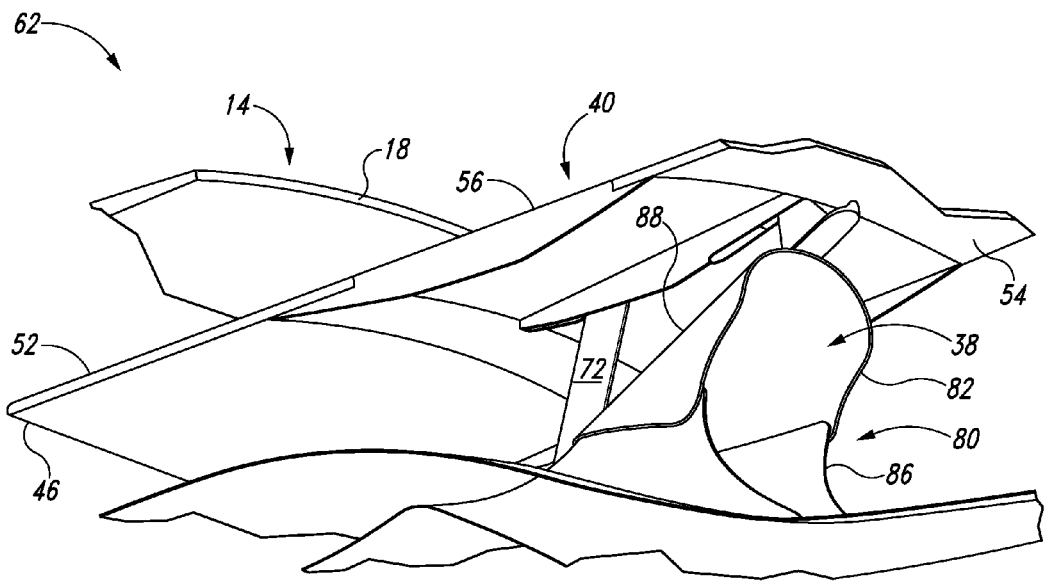
FIG. 5 is a drawing of a radial section of an illustrative, non-exclusive example of a turbofan engine in an active configuration, showing detail around a bypass splitter shell.
Figure 6:
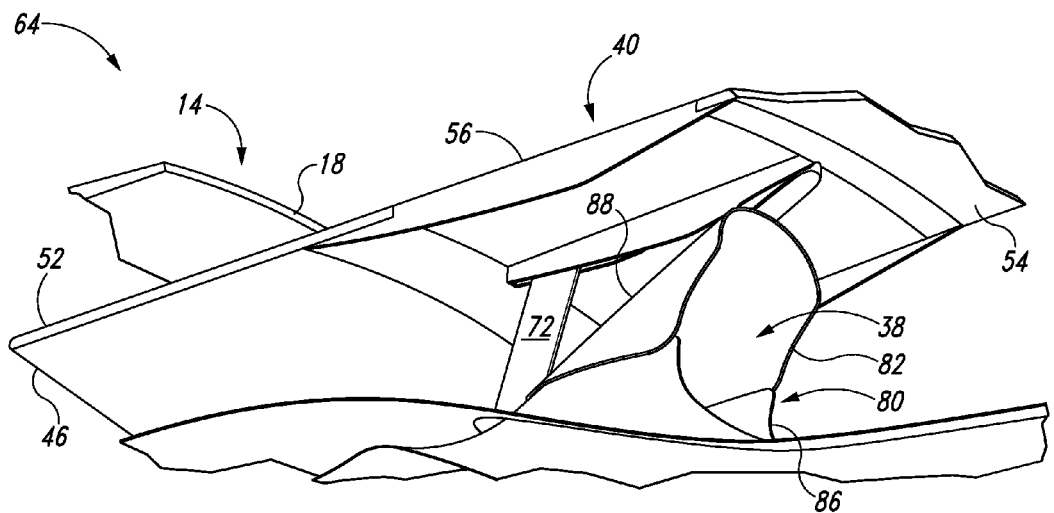
FIG. 6 is a drawing of the radial section of the turbofan engine of FIG. 5 in an idle configuration, showing detail around the bypass splitter shell.

The illustrative, non-exclusive examples of FIGS. 4-6 more clearly show particular embodiments of optional lobed mixer 80 and are instructive for reference but are not limiting of lobed mixers 80 generally. Each of the protruding lobes 88 of the lobed mixer 80 are defined by a mixer cuff 82, as viewed in the example of FIG. 4. Each mixer cuff 82 is configured to direct (e.g., radially redirect) a portion of the core exhaust flow 108 into a portion of the mixed exhaust duct 50, thus interleaving alternating portions of core exhaust flow 108 and interstitial bypass flow 104 which then intermix within a short axial length in the mixed exhaust duct 50. Where the lobed mixer 80 includes a plurality of mixer cuffs 82, the mixer cuffs 82 generally are radially spaced apart along a circumference of the lobed mixer 80 (e.g., the core exhaust duct 36, the core engine shroud 28, and/or the core engine 26), as also viewed in the example of FIG. 4. The mixer cuffs 82 generally extend into the space between the core engine 26 and the bypass splitter shell 40 and form an alternating peak and trough scalloped exit nozzle (or a series of scalloped exit nozzles) from the interstitial bypass duct 42 into the mixed exhaust duct 50. In this configuration, the mixed exhaust duct 50 receives a series of radially-spaced interstitial bypass flows 104 interleaved with a series of radially-spaced core exhaust flows 108. Where one or more pillars 72 also are present between the core engine 26 and the bypass splitter shell 40, mixer cuffs 82 may be radially aligned with and/or downstream (aftward) of the pillars 72. For example, at least one lobe 88 and/or mixer cuff 82 may be radially aligned with and/or downstream of a pillar 72. Mixer cuffs 82 may be pivotally coupled to the core exhaust duct 36, each overlapping a mixer cuff base 86, as schematically illustrated in FIG. 3 and also illustrated in the detailed radial sections of the illustrative, non-exclusive example of FIGS. 5-6. In the active configuration 62 of the turbofan engine 12 (which also may be referred to as the active configuration of the mixer cuffs 82), the mixer cuffs 82 direct core exhaust flow 108 generally aftward and have a relatively smaller mixer cuff open volume 84, as viewed in FIG. 3 and illustrated in dot-dash line. In the idle configuration 64 (which also may be referred to as the idle configuration of the mixer cuffs 82), the mixer cuffs 82 may (re)direct the core exhaust flow 108 more radially outward than in the active configuration 62 and may have a relatively larger mixer cuff open volume 84, as illustrated in dashed line. The changes in the orientation of the mixer cuffs 82 and the mixer cuff open volumes 84 are configured to avail more open area to match the pressure of the core exhaust flow 108 more closely with the greater amount of interstitial bypass flow 104 when the turbofan engine 12 is in the idle configuration 64. Matching the pressures between the core exhaust flow 108 and the interstitial bypass flow 104 generally results in more efficient mixing in the mixed exhaust duct 50.

As the mixer cuffs 82 pivot when moving between the active configuration 62 and the idle configuration 64, the mixer cuffs 82 remain proximate to the corresponding mixer cuff bases 86. The overlap of the mixer cuff 82 and its corresponding mixer cuff base 86 is sufficient to maintain an essentially continuous exit port with little leakage of core exhaust flow 108 from between the mixer cuff 82 and its corresponding mixer cuff base 86. The leakage between a mixer cuff base 86 and its corresponding mixer cuff 82 may be kept minimal without seals by pressure matching between the core exhaust flow 108 and the interstitial bypass flow 104. As viewed in FIG. 5, in the active configuration 62, mixer cuffs 82 generally are canted radially inward with a relatively high overlap between the mixer cuff 82 and its corresponding mixer cuff base 86. As viewed in FIG. 6, in the idle configuration 64, mixer cuffs 82 generally are canted relatively radially outward (less radially inward than in the active configuration 62) with a relatively low overlap between the mixer cuff 82 and its corresponding mixer cuff base 86.

Mixer cuffs 82 may be in contact with the bypass splitter shell 40, at least in the active configuration 62. Mixer cuffs 82 may remain in contact with the bypass splitter shell 40 as the turbofan engine 12 moves between the active configuration 62 and the idle configuration 64. The mixer cuffs 82 may be movably (e.g., slidably) coupled to the bypass splitter shell 40. If the mixer cuffs 82 are movably coupled to the bypass splitter shell 40, motion of the bypass splitter shell 40 (e.g., from the action of the actuator 70) may be sufficient to transition the mixer cuffs 82 between the active configuration 62 and the idle configuration 64. Additionally or alternatively, in operation, the core exhaust flow 108 through the mixer cuff 82 may provide force sufficient to maintain contact between the pivoting mixer cuffs 82 and the bypass splitter shell 40 in the active configuration 62 and/or the idle configuration 64.

Figure 7:
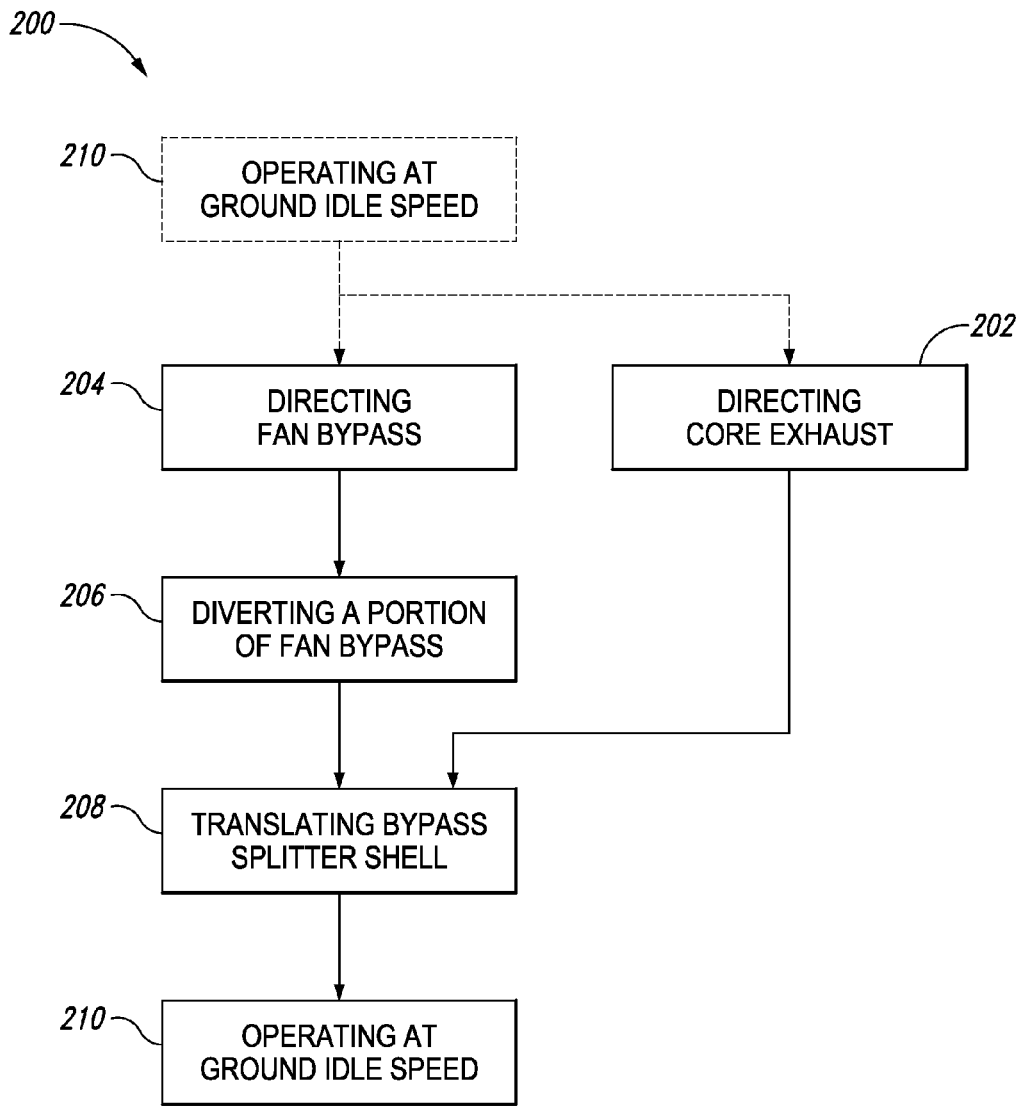
FIG. 7 is a schematic representation of methods of the present disclosure.

FIG. 7 schematically represents methods 200 for reducing and/or dynamically adjusting an average temperature and/or speed of aircraft engine exhaust. Methods 200 are generally applicable to operation of aircraft 10 and/or turbofan engines 12, and may be applicable to suitably configured aircraft and/or turbofan engines. Methods 200 comprise directing 202 a core exhaust flow (which also may be referred to as a stream and/or a plume), e.g., a core exhaust flow 108, through a core exhaust duct, e.g., a core exhaust duct 50, of an aircraft engine. Methods 200 further comprise directing 204 a fan bypass flow (which also may be referred to as a stream), e.g., a bypass flow 102, through a fan bypass duct, e.g., a bypass duct 24, of the aircraft engine. Methods 200 further comprise diverting 206 a portion of the fan bypass flow, e.g., an interstitial bypass flow 104, into an interstitial bypass duct, e.g., an interstitial bypass duct 42, of the aircraft engine to mix the portion of the fan bypass flow with the core exhaust flow to form a first mixed exhaust flow (which also may be referred to as a stream and/or a plume), e.g., a mixed exhaust flow 110. The interstitial bypass duct is defined by a bypass splitter shell, e.g., a bypass splitter shell 40, radially surrounding at least a portion of the core exhaust duct. Methods 200 further comprise translating 208 the bypass splitter shell aftward to increase the portion of the fan bypass flow diverted to form a second mixed exhaust flow that is cooler and/or slower than the first mixed exhaust flow. Methods 200 may comprise operating 210 the aircraft engine at, or substantially at, ground idle speed. Operating 210 may be performed before, during, and/or after directing 202 the core exhaust flow, directing 204 the fan bypass flow, diverting 206 a portion of the fan bypass, and/or translating 208 the bypass splitter shell.

Translating 208 may include actuating the bypass splitter shell aftward to increase the portion of the fan bypass flow diverted to form a second mixed exhaust flow that is cooler and/or slower than the first mixed exhaust flow. Additionally or alternatively, translating 208 may include pivoting a mixer cuff outwardly, e.g., a mixer cuff 82, of a lobed mixer, e.g., a lobed mixer 80, optionally while translating the bypass splitter shell aftward. The pivoting may increase the efficiency of mixing of the core exhaust flow and the increased entrained portion of the fan bypass flow.

Methods 200 may result in producing, with the aircraft engine, the second mixed exhaust flow with an average temperature (at the mixed exhaust nozzle exit, e.g., nozzle exit 60) of less than 200° C., less than 150° C., less than 120° C., less than 100° C., less than 80° C., less than 60° C., or less than 50° C. Methods 200 may result in producing, with the aircraft engine, the second mixed exhaust flow at ground level (i.e., a ground-level jet wash) with an average speed of less than 150 km/h, less than 100 km/h, less than 80 km/h, or less than 60 km/h (as generally measured at the mixed exhaust nozzle exit). Methods 200 may comprise operating the aircraft engine while emitting the second (cooler and/or slower) mixed exhaust flow near personnel outside of the aircraft. With a sufficiently low temperature and/or a sufficiently slow ground-level jet wash emitted from the aircraft engine, personnel may be closer than 60 m, closer than 20 m, closer than 10 m, closer than 8 m, closer than 6 m, closer than 5 m, closer than 4 m, closer than 3 m, or closer than 2 m from the nozzle exit without significant risk of harm from hot and/or fast aircraft engine exhaust. With methods and systems of the present disclosure, sufficiently low temperature engine exhaust and sufficiently slow ground-level jet wash may be achieved without employing core engine thrust reversers or other mechanisms to redirect core engine exhaust out of the mixed exhaust flow.

Personnel may operate near aircraft for cargo/airlifter operations (e.g., with military aircraft such as the C-17, civilian aircraft operated under the CRAF fleet, and/or VIP aircraft) and/or for medical (e.g., medevac) operations. As examples, the military uses ERO procedures in tactical arenas, and some aircraft are used to transport organs for transplant and/or to transport people as an air ambulance.

Aircraft that operate on the ground near exposed personnel generally may benefit from incorporation of the disclosed turbofan engines and/or from operation according to the disclosed methods. Specifically, systems and methods of the present disclosure may be useful when exhaust from a turbofan engine is directed near to and/or across an area where ground personnel may be exposed to the exhaust.

Further, aircraft components (e.g., engine pylons, flaps, etc.) exposed to mixed exhaust flow 110 during engine ground idle in the idle configuration 64 may experience less wear and/or fatigue and consequently less maintenance and/or replacement than with conventional engines operated conventionally. Additionally or alternatively, components subjected to the cooler mixed exhaust flow 110 may be simplified and/or have less bulk, weight, heat shielding, and/or reinforcement as compared to similar components employed on conventional aircraft. For example, engine pylon heat shields, which are typically formed of a titanium sheath, may be thinner and/or lighter in aircraft 10. In another example, aircraft 10 with wing mounted turbofan engines 12 may have flaps, wing trailing edges, and other controlled components purposefully exposed to mixed exhaust flow 110 during ground idle, takeoff and/or landing. More specifically, some conventional aircraft (e.g., short takeoff and landing aircraft) include a wing trailing edge high-lift system, known as a continuous trailing edge (CTE) system, that selectively or continuously immerses the wing trailing edge (e.g., the flaps) into the hot core exhaust plume. CTE systems are so-called because there is no gap or channel between the inboard and outboard flaps for the hot core exhaust plume to pass through. This channel, called a thrust-gate, was originally created to avoid thermal and mechanical fatigue due to the hot core exhaust plume, at the expense of reduced aerodynamic efficiency. Aircraft 10, including turbofan engines 12, may allow for relaxed design considerations for CTE systems or other structures that are immersed in the mixed exhaust flow 110 due to the reduced temperature and/or velocity of the mixed exhaust flow 110 relative to conventional aircraft.

This application incorporates by reference for all purposes the following references, which describe turbofan engines, bypass splitter shells, engine exhaust mixers, associated acoustic materials, design considerations to cool engine exhaust and/or to muffle engine noise, and methods of operation thereof: U.S. Pat. Nos. 7,762,057, 8,341,935, and U.S. Patent Application Publication No. 2011/0167785.

Illustrative, non-exclusive examples of inventive subject matter according to the present disclosure are described in the following enumerated paragraphs.

A1. A turbofan engine comprising:
a core engine with a core engine shroud and a core exhaust duct;
a nacelle radially surrounding at least a fore portion of the core engine;
a bypass duct defined between the nacelle and the core engine shroud;
a bypass splitter shell substantially coaxial with the nacelle and the core engine, wherein the bypass splitter shell includes a trailing edge outside of the nacelle and a leading edge that extends to the bypass duct to define a peripheral bypass duct between the bypass splitter shell and the nacelle, and to define an interstitial bypass duct between the bypass splitter shell and the core engine shroud; and
an actuator coupled to the bypass splitter shell and configured to axially translate the bypass splitter shell between an idle configuration with a first inlet area of the interstitial bypass duct and an active configuration with a second inlet area of the interstitial bypass duct, wherein the first inlet area is greater than the second inlet area.

A2. The turbofan engine of paragraph A1, wherein a position of the leading edge of the bypass splitter shell in the active configuration is forward of a position of the leading edge of the bypass splitter shell in the idle configuration.

A3. The turbofan engine of any of paragraphs A1-A2, wherein the bypass splitter shell defines, in the idle configuration, a third inlet area of the peripheral bypass duct and defines, in the active configuration, a fourth inlet area of the peripheral bypass duct, wherein the third inlet area is less than the fourth inlet area.

A3.1. The turbofan engine of paragraph A3, wherein the first inlet area is greater than the third inlet area, and wherein the second inlet area is less than the fourth inlet area.

A4. The turbofan engine of any of paragraphs A1-A3.1, wherein the bypass splitter shell defines a mixed exhaust duct positioned to receive flow from the interstitial bypass duct and flow from the core exhaust duct, and optionally wherein the trailing edge of the bypass splitter shell at least partially defines a nozzle exit for the mixed exhaust duct.

A4.1. The turbofan engine of paragraph A4, wherein the mixed exhaust duct is configured to combine flow from the interstitial bypass duct and flow from the core exhaust duct into a mixed exhaust flow.

A4.2. The turbofan engine of any of paragraphs A4-A4.1, wherein the mixed exhaust duct is aftward of the core exhaust duct.

A4.3. The turbofan engine of any of paragraphs A4-A4.2, wherein the mixed exhaust duct is convergent.

A5. The turbofan engine of any of paragraphs A1-A4.3, wherein the turbofan engine includes an idle state wherein the core engine is operating at ground idle speed and the turbofan engine is in the idle configuration.

A6. The turbofan engine of any of paragraphs A1-A5, wherein the idle configuration is configured to produce, while the turbofan engine is in an idle state, a mixed exhaust flow from a combination of flow through the interstitial bypass duct and flow through the core exhaust duct A6.1. The turbofan engine of paragraph A6, wherein the mixed exhaust flow has an average temperature of less than 200° C., less than 150° C., less than 120° C., less than 100° C., less than 80° C., less than 60° C., or less than 50° C., optionally at a nozzle exit at least partially defined by the trailing edge of the bypass splitter shell.

A6.2. The turbofan engine of any of paragraphs A6-A6.1, wherein the mixed exhaust flow has an average speed, optionally at ground level, of less than 150 km/h, less than 100 km/h, less than 80 km/h, or less than 60 km/h, optionally at a nozzle exit at least partially defined by the trailing edge of the bypass splitter shell.

A7. The turbofan engine of any of paragraphs A1-A6.2, wherein the bypass splitter shell is substantially, and/or generally, frustoconical with an opening at the leading edge and an opening at the trailing edge, and with a circumference defined by the leading edge that is larger than a circumference defined by the trailing edge.

A8. The turbofan engine of any of paragraphs A1-A7, wherein the bypass splitter shell has an entrance circumference defined by the leading edge and an exit circumference defined by the trailing edge, wherein the exit circumference is smaller than the entrance circumference.

A9. The turbofan engine of any of paragraphs A1-A8, wherein the core exhaust duct includes a lobed mixer that is configured to direct at least a portion of exhaust from the core engine into air flow from the interstitial bypass duct.

A9.1. The turbofan engine of paragraph A9, wherein the lobed mixer includes a mixer cuff configured to direct a least a portion of exhaust from the core engine into air flow from the interstitial bypass duct.

A9.2. The turbofan engine of any of paragraphs A9-A9.1, wherein the lobed mixer includes a mixer cuff pivotally coupled to the core exhaust duct.

A9.3. The turbofan engine of any of paragraphs A9-A9.2, wherein the lobed mixer includes a mixer cuff movably coupled to the bypass splitter shell.

A9.4. The turbofan engine of any of paragraphs A9-A9.3, wherein the lobed mixer includes a mixer cuff in contact with the bypass splitter shell.

A9.5. The turbofan engine of any of paragraphs A9-A9.4, wherein the lobed mixer includes a mixer cuff, and wherein an open volume of the mixer cuff is greater in the idle configuration than in the active configuration.

A9.6. The turbofan engine of any of paragraphs A9-A9.5, wherein the lobed mixer includes a mixer cuff base and an overlapping mixer cuff, optionally wherein an amount of overlap between the mixer cuff and the mixer cuff base is less in the idle configuration than in the active configuration.

A9.7. The turbofan engine of any of paragraphs A9-A9.6, wherein the lobed mixer includes a plurality of mixer cuffs spaced around a circumference of the core exhaust duct.

A10. The turbofan engine of any of paragraphs A1-A9.7, wherein the bypass splitter shell is supported by a pillar between the bypass splitter shell and at least one of the core engine shroud, the core exhaust duct, and the nacelle.

A10.1. The turbofan engine of paragraph A10, wherein the bypass splitter shell is supported by a plurality of pillars radially spaced apart along a circumference of the bypass splitter shell.

A10.2. The turbofan engine of any of paragraphs A10-A10.1, wherein the pillar is coupled to the actuator and a mechanism configured to permit selective axial translation of the bypass splitter shell between the idle configuration and the active configuration, optionally wherein the mechanism is at least one of a rail, a linear rail, a curved rail, a slide, a linear slide, a curved slide, a guide, a linear guide, and a curved guide, and optionally wherein at least one of the bypass splitter shell, the pillar, the core engine shroud, the core exhaust duct, and the nacelle includes the mechanism.

A11. The turbofan engine of any of paragraphs A1-A10.2, wherein the bypass splitter shell includes an acoustic attenuator, optionally wherein the acoustic attenuator includes at least one of a porous material, a honeycomb sandwich structure, a bulk absorbing material, and a foam.

A12. The turbofan engine of any of paragraphs A1-A11, wherein the bypass splitter shell includes a fore portion that includes the leading edge, an aft portion that includes the trailing edge, and/or a central portion between the fore portion/leading edge and the aft portion/trailing edge.

A12.1. The turbofan engine of paragraph A12, wherein the bypass splitter shell is supported by a pillar between the central portion of the bypass splitter shell and at least one of the core engine shroud and the nacelle, optionally wherein the central portion is coupled to the pillar.

A12.2. The turbofan engine of any of paragraphs A12-A12.1, wherein the central portion is configured to support the bypass splitter shell.

A12.3. The turbofan engine of any of paragraphs A12-A12.2, wherein the fore portion and the aft portion are only supported by the central portion.

A12.4. The turbofan engine of any of paragraphs A12-A12.3, wherein the fore portion and the aft portion each include an acoustic attenuator.

A12.5. The turbofan engine of any of paragraphs A12-A12.4, wherein the central portion is free of, or does not include, an acoustic attenuator.

A13. The turbofan engine of any of paragraphs A1-A12.5, wherein the actuator is a hydraulic actuator.

A14. The turbofan engine of any of paragraphs A1-A13, further comprising a fan within the nacelle and forward of the core engine.

A15. The turbofan engine of any of paragraphs A1-A14, wherein the bypass duct is positioned to transmit fan pressurized air.

A16. The turbofan engine of any of paragraphs A1-A15, wherein the nacelle is a short nacelle. A17. An aircraft that includes the turbofan engine of any of paragraphs A1-A16.

B1. A turbofan engine comprising:
a nacelle with an aft portion;
a bypass splitter shell with a fore portion, wherein the bypass splitter shell is substantially coaxial with the nacelle, wherein the fore portion of the bypass splitter shell is surrounded by the aft portion of the nacelle, wherein the bypass splitter shell is configured to divert a portion of a fan bypass flow toward a core exhaust flow for mixing the portion of the fan bypass flow with the core exhaust flow; and
an actuator coupled to the bypass splitter shell and configured to selectively translate the bypass splitter shell aftward to increase the portion of the fan bypass flow during ground idle operation of the turbofan engine.

B2. The turbofan engine of paragraph B1, wherein the bypass splitter shell includes an acoustic attenuator, optionally wherein the acoustic attenuator includes at least one of a porous material, a honeycomb sandwich structure, a bulk absorbing material, and a foam.

B3. The turbofan engine of any of paragraphs B1-B2, wherein the bypass splitter shell includes a central portion and/or an aft portion.

B3.1. The turbofan engine of paragraph B3, wherein the fore portion and the aft portion each include an acoustic attenuator.

B3.2. The turbofan engine of any of paragraphs B3-B3.1, wherein the central portion is configured to support the bypass splitter shell.

B3.3. The turbofan engine of any of paragraphs B3-B3.2, wherein the fore portion and the aft portion are only supported by the central portion.

B3.4. The turbofan engine of any of paragraphs B3-B3.3, wherein the central portion is free of, or does not include, an acoustic attenuator.

B4. The turbofan engine of any of paragraphs B1-B3.4, wherein the actuator is a hydraulic actuator.

B5. The turbofan engine of any of paragraphs B1-B4, wherein, when the actuator has translated the bypass splitter shell aftward and when the engine is operated at ground idle speed, the mass ratio of the portion of fan bypass flow to the core exhaust flow is about 1.5, about 2, about 2.5, about 3, or about 4; greater than 1.5, greater than 2, or greater than 3; and/or less than 5, less than 4, or less than 3.

B6. The turbofan engine of any of paragraphs B1-B5, wherein, when the actuator has translated the bypass splitter shell aftward and the turbofan engine is in an idle state, an average temperature of a mixed exhaust flow formed of the portion of fan bypass flow and core exhaust flow is less than 200° C., less than 150° C., less than 120° C., less than 100° C., less than 80° C., less than 60° C., or less than 50° C., optionally at a nozzle exit at least partially defined by a trailing edge of the bypass splitter shell.

B7. The turbofan engine of any of paragraphs B1-B6, wherein, when the actuator has translated the bypass splitter shell aftward and the turbofan engine is in an idle state, an average speed of a mixed exhaust flow formed of the portion of fan bypass flow and core exhaust flow is less than 150 km/h, less than 100 km/h, less than 80 km/h, or less than 60 km/h, optionally at ground level, and/or optionally at a nozzle exit at least partially defined by a trailing edge of the bypass splitter shell.

B8. The turbofan engine of any of paragraphs B1-B7, further comprising a fan within the nacelle and forward of the aft portion, wherein the fan is configured to produce the fan bypass flow.

B9. The turbofan engine of any of paragraphs B1-B8, further comprising a core engine at least partially within the nacelle, wherein the core engine is configured to produce the core exhaust flow.

B10. The turbofan engine of any of paragraphs B1-B9, wherein the nacelle is a short nacelle.

B11. The turbofan engine of any of paragraphs B1-B10, wherein the turbofan engine is the turbofan engine of any of paragraphs A1-A16.

B12. An aircraft that includes the turbofan engine of any of paragraphs B1-B11.

C1. A method of reducing an average temperature of aircraft engine exhaust while the aircraft is idling on the ground, the method comprising:
operating an aircraft engine at ground idle speed;
directing a core exhaust flow through a core exhaust duct of the aircraft engine;
directing a fan bypass flow through a fan bypass duct of the aircraft engine;
diverting a portion of the fan bypass flow into an interstitial bypass duct of the aircraft engine to mix the portion of the fan bypass flow with the core exhaust flow to form a first mixed exhaust flow, wherein the interstitial bypass duct is defined by a bypass splitter shell radially surrounding at least a portion of the core exhaust duct; and
translating the bypass splitter shell aftward to increase the portion of the fan bypass flow diverted to form a second mixed exhaust flow that is cooler than the first mixed exhaust flow.

C2. The method of paragraph C1, wherein the core exhaust duct includes a lobed mixer with a mixer cuff pivotally coupled to the core exhaust duct and movably coupled to the bypass splitter shell, and wherein the translating includes pivoting the mixer cuff.

C2.1. The method of paragraph C2, wherein the pivoting increases an efficiency of mixing of the core exhaust flow and the fan bypass flow.

C2.2. The method of any of paragraphs C2-C2.1, wherein the lobed mixer includes a plurality of mixer cuffs radially spaced around a circumference of the core exhaust duct;

C3. The method of any of paragraphs C1-C2.2, wherein the translating includes actuating the bypass splitter shell aftward to increase the portion of the fan bypass flow diverted to form a second mixed exhaust flow that is cooler than the first mixed exhaust flow.

C4. The method of any of paragraphs C1-C3, wherein the second mixed exhaust flow has an average temperature of less than 200° C., less than 150° C., less than 120° C., less than 100° C., less than 80° C., less than 60° C., or less than 50° C., optionally at a nozzle exit at least partially defined by a trailing edge of the bypass splitter shell.

C5. The method of any of paragraphs C1-C4, wherein the method is a method of reducing an average speed of aircraft engine exhaust while the aircraft is idling on the ground.

C6. The method of any of paragraphs C1-05, wherein the second mixed exhaust flow has an average speed of less than 150 km/h, less than 100 km/h, less than 80 km/h, or less than 60 km/h, optionally at ground level, and/or optionally at a nozzle exit at least partially defined by a trailing edge of the bypass splitter shell.

C7. The method of any of paragraphs C1-C6, further comprising operating the aircraft engine while emitting the second mixed exhaust flow near personnel outside of the aircraft, optionally wherein the personnel are closer than 60 m, closer than 20 m, closer than 10 m, closer than 8 m, closer than 6 m, closer than 5 m, closer than 4 m, closer than 3 m, or closer than 2 m from the core exhaust duct.

C8. The method of any of paragraphs C1-C7, wherein the method is performed with the turbofan engine of any of paragraphs A1-A16 and/or B1-B11 and/or the aircraft of any of paragraphs A17 and/or B12.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function. Further, as used herein, the singular forms "a", "an" and "the" may be intended to include the plural forms as well, unless the context clearly indicates otherwise.

The various disclosed elements of apparatuses and steps of methods disclosed herein are not required of all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

In the event that any patents or patent applications are incorporated by reference herein and (1) define a term in a manner and/or (2) are otherwise inconsistent with either the non-incorporated portion of the present disclosure or with any of the other incorporated references, the non-incorporated portion of the present disclosure shall control, and the term or incorporated disclosure therein shall only control with respect to the reference in which the term is defined and/or the incorporated disclosure was originally present.

The invention claimed is:

1. A turbofan engine comprising:
a core engine with a core engine shroud and a core exhaust duct;
a nacelle radially surrounding at least a fore portion of the core engine;
a bypass duct defined between the nacelle and the core engine shroud;
a bypass splitter shell substantially coaxial with the nacelle and the core engine, wherein the bypass splitter shell includes a trailing edge outside of the nacelle and a leading edge that extends into the bypass duct to define a peripheral bypass duct between the bypass splitter shell and the nacelle, and to define an interstitial bypass duct between the bypass splitter shell and the core engine shroud; and
an actuator coupled to the bypass splitter shell and configured to axially translate the bypass splitter shell between an idle configuration with a first inlet area of the interstitial bypass duct and an active configuration with a second inlet area of the interstitial bypass duct, wherein the first inlet area is greater than the second inlet area;
wherein the turbofan engine includes an idle state wherein the core engine is operating at ground idle speed and the turbofan engine is in the idle configuration.

2. The turbofan engine of claim 1, wherein a position of the leading edge of the bypass splitter shell in the active configuration is forward of a position of the leading edge of the bypass splitter shell in the idle configuration.

3. The turbofan engine of claim 1, wherein the bypass splitter shell defines, in the idle configuration, a third inlet area of the peripheral bypass duct and defines, in the active configuration, a fourth inlet area of the peripheral bypass duct, wherein the third inlet area is less than the fourth inlet area.

4. The turbofan engine of claim 1, wherein the bypass splitter shell defines a mixed exhaust duct positioned to receive flow from the interstitial bypass duct and flow from the core exhaust duct.

5. The turbofan engine of claim 1, wherein the idle configuration is configured to produce, while the turbofan engine is in the idle state, a mixed exhaust flow from a combination of flow through the interstitial bypass duct and flow through the core exhaust duct, and wherein the mixed exhaust flow has an average temperature of less than 80° C.

6. The turbofan engine of claim 1, wherein the core exhaust duct includes a lobed mixer that is configured to direct at least a portion of exhaust from the core engine into air flow from the interstitial bypass duct.

7. The turbofan engine of claim 6, wherein the lobed mixer includes a mixer cuff pivotally coupled to the core exhaust duct and movably coupled to the bypass splitter shell.

8. The turbofan engine of claim 6, wherein the lobed mixer includes a mixer cuff, and wherein an open volume of the mixer cuff is greater in the idle configuration than in the active configuration.

9. The turbofan engine of claim 6, wherein the lobed mixer includes a plurality of mixer cuffs spaced around a circumference of the core exhaust duct.

10. The turbofan engine of claim 1, wherein the bypass splitter shell includes a fore portion that includes the leading edge, an aft portion that includes the trailing edge, and a central portion between the fore portion and the aft portion, wherein the central portion is configured to support the bypass splitter shell.

11. The turbofan engine of claim 10, wherein the fore portion and the aft portion are only supported by the central portion.

12. A turbofan engine comprising:
a nacelle with an aft portion;
a bypass splitter shell with a fore portion, wherein the bypass splitter shell is substantially coaxial with the nacelle, wherein the fore portion of the bypass splitter shell is surrounded by the aft portion of the nacelle, wherein the bypass splitter shell is configured to divert a portion of a fan bypass flow toward a core exhaust flow for mixing the portion of the fan bypass flow with the core exhaust flow; and an actuator coupled to the bypass splitter shell and configured to selectively translate the bypass splitter shell aftward to increase the portion of the fan bypass flow during ground idle operation of the turbofan engine.

13. The turbofan engine of claim 12, wherein the bypass splitter shell includes a central portion and an aft portion, wherein the central portion is configured to support the bypass splitter shell.

14. The turbofan engine of claim 12, wherein, when the actuator has translated the bypass splitter shell aftward and when the turbofan engine is operated at ground idle speed, the mass ratio of the portion of fan bypass flow to the core exhaust flow is greater than 2 and less than 5.

15. The turbofan engine of claim 12, wherein, when the actuator has translated the bypass splitter shell aftward and the turbofan engine is in an idle state, an average temperature of a mixed exhaust flow formed of the portion of fan bypass flow and core exhaust flow is less than 80° C.

16. The turbofan engine of claim 12, further comprising a lobed mixer with a mixer cuff with a mixer cuff that is configured to direct at least a portion of the core exhaust flow into the portion of the fan bypass flow.

17. A method of reducing an average temperature of aircraft engine exhaust while an aircraft is idling on the ground, the method comprising:

operating an aircraft engine at ground idle speed;
directing a core exhaust flow through a core exhaust duct of the aircraft engine;
directing a fan bypass flow through a fan bypass duct of the aircraft engine;
diverting a portion of the fan bypass flow into an interstitial bypass duct of the aircraft engine to mix the portion of the fan bypass flow with the core exhaust flow to form a first mixed exhaust flow, wherein the interstitial bypass duct is defined by a bypass splitter shell radially surrounding at least a portion of the core exhaust duct; and
translating the bypass splitter shell aftward to increase the portion of the fan bypass flow diverted to form a second mixed exhaust flow that is cooler than the first mixed exhaust flow.

18. The method of claim 17, wherein the core exhaust duct includes a lobed mixer with a mixer cuff pivotally coupled to the core exhaust duct and movably coupled to the bypass splitter shell, and wherein the translating includes pivoting the mixer cuff.

19. The method of claim 18, wherein the pivoting increases an efficiency of mixing of the core exhaust flow and the fan bypass flow.

* * * * *